United States Patent
Sasaki

(10) Patent No.: US 8,386,936 B2
(45) Date of Patent: Feb. 26, 2013

(54) PROCESSING APPARATUS FOR DISPLAYING CONTENT TITLE

(75) Inventor: Hiroyuki Sasaki, Chita (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 665 days.

(21) Appl. No.: 12/563,664

(22) Filed: Sep. 21, 2009

(65) Prior Publication Data

US 2010/0077339 A1    Mar. 25, 2010

(30) Foreign Application Priority Data

Sep. 24, 2008 (JP) ................................. 2008-243839

(51) Int. Cl.
*G06F 3/00* (2006.01)
(52) U.S. Cl. .................. 715/733; 715/738; 715/744
(58) Field of Classification Search .................. 715/744, 715/745, 733, 738, 810, 811, 825, 828
See application file for complete search history.

(56) References Cited

U.S. PATENT DOCUMENTS

| | | | |
|---|---|---|---|
| 2005/0177799 A1* | 8/2005 | Knight et al. | 715/810 |
| 2005/0289468 A1* | 12/2005 | Kahn et al. | 715/738 |
| 2006/0253786 A1* | 11/2006 | Hilbert et al. | 715/742 |
| 2007/0174298 A1* | 7/2007 | Tanimoto | 707/10 |
| 2008/0297829 A1* | 12/2008 | Paek | 358/1.15 |

FOREIGN PATENT DOCUMENTS

JP    2007-334476    12/2007

OTHER PUBLICATIONS

"Dirty News Reader" displaying titles of distributed articles on RSS sites like an electronic signboard published May 26, 2004 by Impress Corporation and written by Tomoyuki Otsu. (For statement of relevance see p. 1 of applicant's specification).

* cited by examiner

*Primary Examiner* — Kieu Vu
*Assistant Examiner* — Blaine Basom
(74) *Attorney, Agent, or Firm* — Banner & Witcoff, Ltd.

(57) ABSTRACT

A processing apparatus configured to perform a process in accordance with a processing instruction, and connected to a network is provided. The processing apparatus may store address information of summarized content information that includes at least titles of content, acquire the summarized content information based on the address information, allow a user to input an instruction, receive a first processing instruction from the network, display the titles of the content included in the summarized content information on a display unit in a case where a second processing instruction is input by the user, display the titles of the content included in the summarized content information on the display unit on a condition that a predetermined instruction is input by the user in a case where the first processing instruction is received, and terminate the display of the titles of content in a case where a predetermined condition is met.

9 Claims, 9 Drawing Sheets

PROCESSING APPARATUS FOR DISPLAYING CONTENT TITLE

CROSS-REFERENCE TO RELATED APPLICATION

This application claims priority to Japanese Patent Application No. 2008-243839, filed on Sep. 24, 2008, the contents of which are hereby incorporated by reference into the present application.

BACKGROUND

1. Field

The present specification discloses a processing apparatus that is to be communicably connected to a network and that performs a process in accordance with a processing instruction. Specifically, the present specification discloses a processing apparatus that displays a title of a content published on the network.

2. Description of the Related Art

A variety of content is published on a network. A server that publishes summarized content information including a URL and a title of each content is connected to the network. One example of the summarized content information is feed information. Formats for feed information include, for example, RSS and Atom. A software for acquiring the feed information and displaying content is disclosed on a website (http://www.forest.impress.co.jp/article/2004/05/26/dirtynewsreader.html) located on the Internet on Jul. 29, 2008, titled "Dirty News Reader displays titles of distributed articles on RSS sites like an electronic signboard", published May 26, 2004 by Impress Corporation and written by Tomoyuki Otsu. When this software is installed on a PC, a user can view the title of each content. When the user clicks on a title, the PC opens a browser, and accesses the URL of the content corresponding to that title. The content is thereby displayed on the PC.

BRIEF SUMMARY

A method in which a title of content is always displayed on a processing apparatus may be employed. However, this method is not preferable from an energy conservation point of view because the title of the content will also be displayed even when a user is not using the processing apparatus. The present specification discloses a processing apparatus that can display a title of content and achieve low energy consumption.

A technology disclosed in the present specification may be a processing device. The processing device may perform a process in accordance with a processing instruction, and may be connected to a network in a communicable manner. The aforementioned term "processing apparatus" is a concept including any apparatus that performs a process in a case where a processing instruction from the user is input. Examples of the processing apparatus include a printer, scanner, a photocopier, a facsimile machine, a multi-function device, etc. The processing apparatus may comprise an address information storage unit, a summarized information acquisition unit, a display unit, an instruction input unit, an instruction receiving unit, a display control unit, and a title display termination unit. Each of these units will be described in detail below.

The address information storage unit may be configured to store address information of summarized content information that includes at least titles of content. The aforementioned term "address information" is a concept including any information indicative of the address of the summarized content information. One example of address information is a URL (Uniform Resource Locator). In addition, the aforementioned term "content" may be a text data, or may be other type(s) of data (e.g., image data, music data, and/or movie data). The summarized information acquisition unit may be configured to acquire the summarized content information based on the address information stored in the address information storage unit. The display unit may be configured to display information. The instruction input unit may be configured to allow the user to operate for inputting an instruction. The instruction receiving unit may be configured to receive a first processing instruction from the network. Note what process is instructed by the aforementioned term "first processing instruction" is not particularly limited. Examples of the first processing instruction may include a print instruction, a scan instruction, communication instruction (e.g., facsimile sending instruction), display instruction, etc.

The display control unit may be configured to display the titles of the content included in the summarized content information acquired by the summarized information acquisition unit on the display unit in a case where a second processing instruction is input to the instruction input unit. Note what process is instructed by the aforementioned term "second processing instruction" is not particularly limited. Examples of the second processing instruction may include a print instruction, a scan instruction, communication instruction (e.g., facsimile sending instruction), display instruction, etc. In addition, the display control unit may be configured to display the titles of the content included in the summarized content information acquired by the summarized information acquisition unit on the display unit on a condition that a predetermined instruction is input to the instruction input unit in a case where the first processing instruction is received by the instruction receiving unit. Note that the aforementioned term "on a condition" does not exclude the addition of other conditions (an AND condition and/or an OR condition). When the term "on a condition" is used, other conditions may be included. The term "on a condition" will have the same meaning hereinafter. The title display termination unit may be configured to terminate the display of the titles of the content in a case where a predetermined condition is met. Examples of the "predetermined condition" may be that a predetermined time passed since the display of the titles of the content has begun, or that the user inputs a display termination instruction into the processing apparatus, etc.

DETAILED DESCRIPTION OF THE PREFERRED EMBODIMENT (Embodiment)

Figure 1:
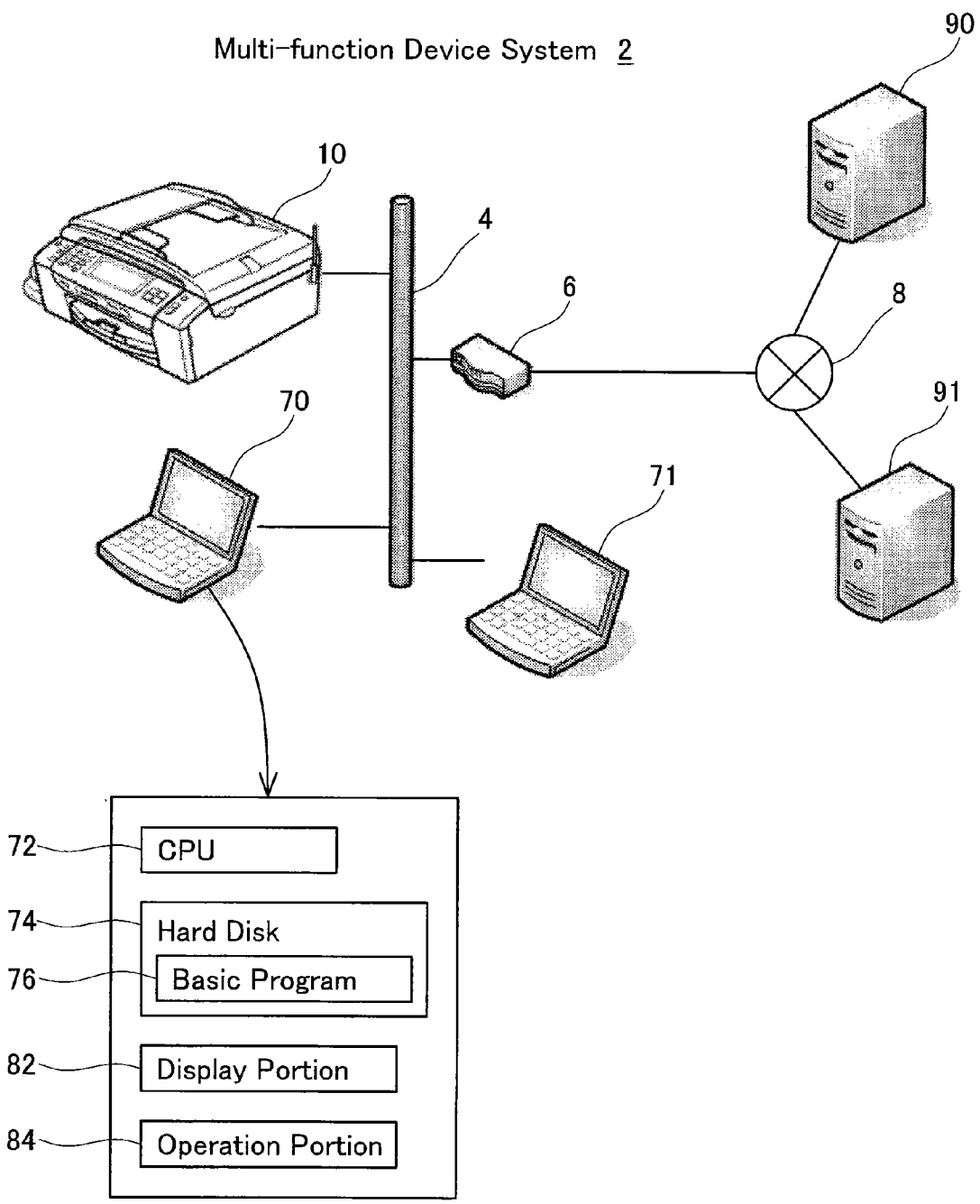
FIG. 1 shows a schematic configuration of a multi-function device system.

As FIG. 1 shows, the multi-function device system 2 comprises a multi-function device 10, a plurality of PCs 70, 71, and a plurality of content servers 90, 91. Note that in FIG. 1, although only one multi-function device 10, two PCs 70, 71, and two content servers 90, 91 are shown, the exact numbers of these elements included in the system can be changed as desired. The multi-function device 10 is connected to a LAN line 4. Each PC 70, 71 is connected to the LAN line 4. The LAN line 4 is connected to the Internet 8 via a router 6. Each content server 90, 91 is connected to the Internet 8. In the present embodiment, the content server 90 publishes one site, and the content server 91 publishes another site. Each site includes content. Furthermore, each content server 90, 91 stores feed information (RSS type feed information) which is summarized information of the content that the content server includes. Details of the information will be described later.

(Configuration of the PC)

FIG. 1 shows a schematic configuration of PC 70. The PC 71 has the same configuration as the PC 70. The PC 70 has a CPU 72, a hard disk 74, a display portion 82, an operation portion 84, etc. Note that although not shown in FIG. 1, PC 70 has a network interface that is connected to the LAN line 4.

The CPU 72 executes various processes in accordance with programs 76 stored on the hard disk 74. The processes executed by the CPU 72 will be described below in greater detail. A basic program 76 is a program for controlling the basic operation of the PC 70. The basic program 76 includes, for example, a browser program for downloading and displaying an item of content from a site on the Internet 8, and a program for sending a print instruction to a print performing apparatus, e.g., the multi-function device 10.

The display portion 82 can display various information. The operation portion 84 is constructed from a keyboard and mouse. A user can input various instructions (commands) and information into the PC 70 by operating the operation portion 84.

(Configuration of the Multi-Function Device)

Figure 2:
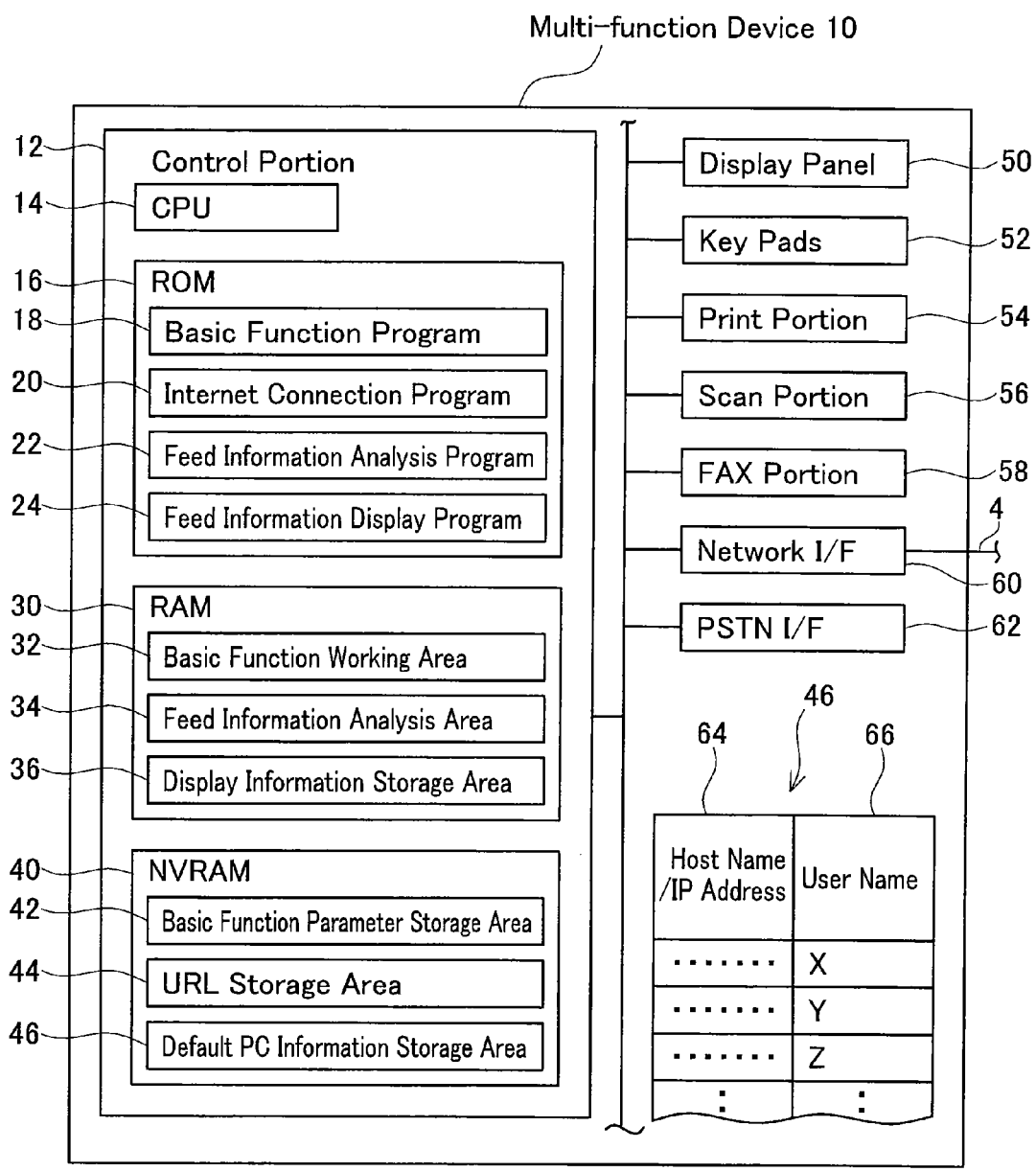
FIG. 2 shows a schematic configuration of a multi-function device.

As FIG. 2 shows, the multi-function device 10 has a control portion 12, a display panel 50, a key pad 52, a print portion 54, a scan portion 56, a fax (facsimile) portion 58, a network interface 60, a PSTN interface 62, etc. The control portion 12 has a CPU 14, ROM 16, RAM 30, NVRAM 40, etc.

The CPU 14 executes various processes in accordance with programs 18 to 26 stored in the ROM 16. The processes executed by the CPU 14 will be described below in greater detail. The ROM 16 stores various programs 18 to 26. A basic function program 18 is a program for controlling the basic operation of the multi-function device 10. The basic function program 18 includes, for example, a program for generating display data to be displayed on the display panel 50. In addition, the basic function program 18 includes, for example, one or more programs for controlling the print portion 54, the scan portion 56, the fax portion 58, etc. An interne connection program 20 is a program for connecting to the Internet 8. A feed information analysis program 22 is a program for analyzing the feed information acquired from the content servers 90, 91, and generating information for display on the display panel 50 (hereinafter referred to as display information). A feed information display program 24 is a program for displaying the display information.

The RAM 30 has various storage areas 32 to 38. A basic function working area 32 is a storage area for storing various types of data generated during the execution of processes in accordance with the basic function program 18. A feed information analysis area 34 is a storage area for storing various types of data generated during the execution of processes in accordance with the feed information analysis program 22. A display information storage area 36 is a storage area for storing the display information generated in accordance with the feed information analysis program 22.

The NVRAM 40 has various storage areas 42 to 46. A basic function parameter storage area 42 is a storage area for storing various parameters (e.g., print settings, scan settings, etc.) used when the CPU 14 executes processes in accordance with the basic function program 18. A URL storage area 44 is a storage area for storing the URLs for the feed information in each content server 90, 91. For example, the user may have to register in order to receive content from each content server 90, 91. This registration may be performed by using the multi-function device 10, or may be performed by using the PCs 70, 71. For example, if the user has used the PC 70 to register in order to receive content from the content server 90, the URL of the feed information in the content server 90 is sent from the PC 70 to the multi-function device 10. As a consequence, the URL of the feed information in the content server 90 is stored in the URL storage area 44.

A default PC information storage area 46 stores information for identifying the IP address of a PC or the host name of a PC (hereinafter referred to as PC identifying information), etc. The user can input the PC identifying information of a PC (e.g., PC 70) that the user may use and the user's user name into the multi-function device 10. FIG. 2 shows an example of the storage details of the default PC information storage area 46. The default PC information storage area 46 stores the PC identifying information 64 in association with the user name 66 that were input by the user.

The display panel 50 can display various information. The display panel 50 functions as a touch panel. The key pad 52 includes a plurality of keys. The user can input various instructions and information into the multi-function device 10 by operating the key pad 52. The print portion 54 has a print mechanism such as ink jet type, laser type, etc. The scan portion 56 has a reading mechanism such as CCD, CIS, etc. The fax portion 58 performs various operations in order to perform fax communications. The network interface 60 is connected to the LAN line 4. The multi-function device 10 can communicate with the PCs 70, 71 and access the Internet 8. The PSTN interface 62 is connected to a PSTN (Public Switched Telephone Network) not illustrated in the drawings. The PSTN is used when performing fax or telephone communications.

(Storage Details of the URL Storage Area)

Figure 3:
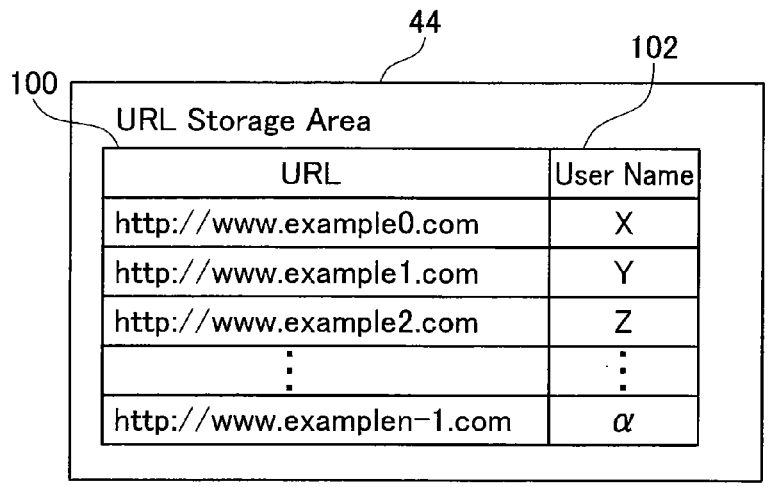
FIG. 3 shows an example of storage details of a URL storage area.

Next, the storage details of the URL storage area 44 of the NVRAM 40 (see FIG. 2) will be explained. In FIG. 3, the URL storage area 44 can store URLs 100 of feed information in each content server 90, 91. In other words, the URL storage area 44 can store URLs 100 of feed information for each site. As noted above, the user must register the URL 100 of the feed information in the multi-function device 10. The URL storage area 44 stores the URL 100 of the feed information and the user name 102 of the person who registered that URL 100 in association. In the example of FIG. 3, the URL of the feed information "http://www.example0.com" was registered by a user whose name is "X". In addition, in the URL storage area 44, only one user name 102 may be associated with one URL 100; or alternately, a plurality of user names 102 may be associated with one URL 100.

(Storage details of the display information storage area)

Figure 4:
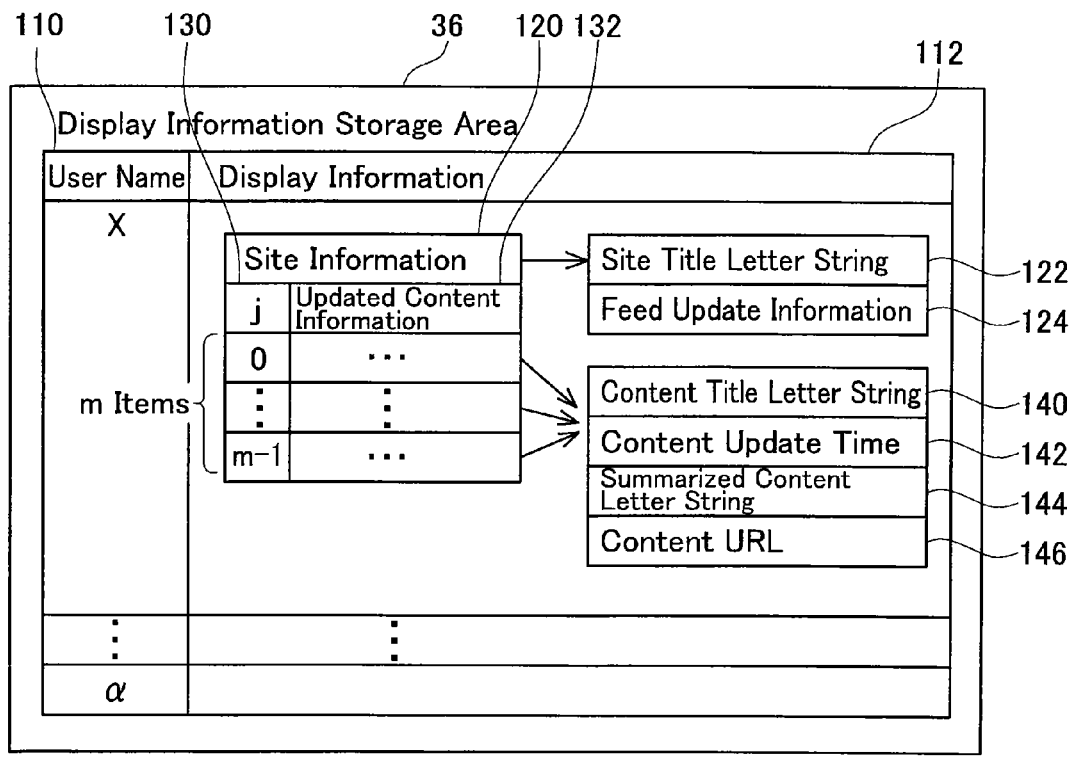
FIG. 4 shows an example of storage details of a display information storage area.

Next, the storage details of the display information storage area 36 of the RAM 30 (see FIG. 2) will be explained. In Fig.4, the display information storage area 36 can store display information 112 for each URL stored in the URL storage area 44. In other words, the display information storage area 36 can store display information 112 for each site stored in the URL storage area 44. As noted above, the URLs 100 associated with each user name 102 are stored in the URL storage area 44 (see FIG. 3). Because of this, display information 112 associated with each user name 110 is also stored in the display information storage area 36.

The data structure of each individual piece of display information 112 will be explained. The display information 112 includes site information 120. The site information 120 includes a site title letter string 122 and feed update information 124. The site title letter string 122 is a letter string of the title of the site. This title can also be restated as "the name of the site". Feed update information 124 is information relating to the time at which the feed information in a content server was updated (e.g., the latest update).

The display information 112 includes updated content information 132. The number of updated content information 132 is equal to the number of content in a site. For example, in FIG. 4, the display information 112 associated with the user name "X" has m pieces of updated content information 132 (m is an integer equal to 1 or more). This means that the site "http://www.example0.com" associated with the user name "X" has m pieces of content. For example, if there is a content related to a weather forecast and content related to sports in a predetermined site, the display information 112 related to that site will have two pieces of updated content information 132. An identification number 130 is assigned to each updated content information 132. In the present embodiment, the identification number 130 is represented with the symbol "j".

Each updated content information 132 includes a content title letter string 140, a content update time 142, a summarized content letter string 144, and a content URL 146. In the aforementioned example, the updated content information 132 associated with the content related to a weather forecast includes information 140 to 146, and the updated content information 132 associated with the content related to sports also includes another set of information 140 to 146. The content title letter string 140 is a letter string of the title of the content. This title can also be restated as "the name of content". The content update time 142 is information indicative of a time at which the content in a content server was updated (the latest update). The summarized content letter string 144 is a letter string in which letter string included in the content that has been summarized. In other words, the summarized content letter string 144 is a letter string that is larger than the title of the content but is smaller than the entire letter string of the content and that reflects the details of the content. The content URL 146 is the URL of the content.

(Process Executed by the PC)

Next, the process executed by the PC 70 will be described. The process executed by the PC 71 is identical. The user can input an instruction into the PC 70 that instructs the multi-function device 10 to print by operating the operation portion 84 of the PC 70. When this instruction is input, the CPU 72 of the PC 70 sends a print instruction that includes the IP address of the PC 70 to the multi-function device 10.

(Feed Information Analyzing Process Executed by the Multi-Function Device)

Next, a feed information analyzing process executed by the multi-function device 10 will be explained. The feed information analyzing process runs as an independent task, and is executed when the multi-function device 10 is activated in accordance with the internet connection program 20 and the feed information analysis program 22 (see FIG. 2).

Figure 5:
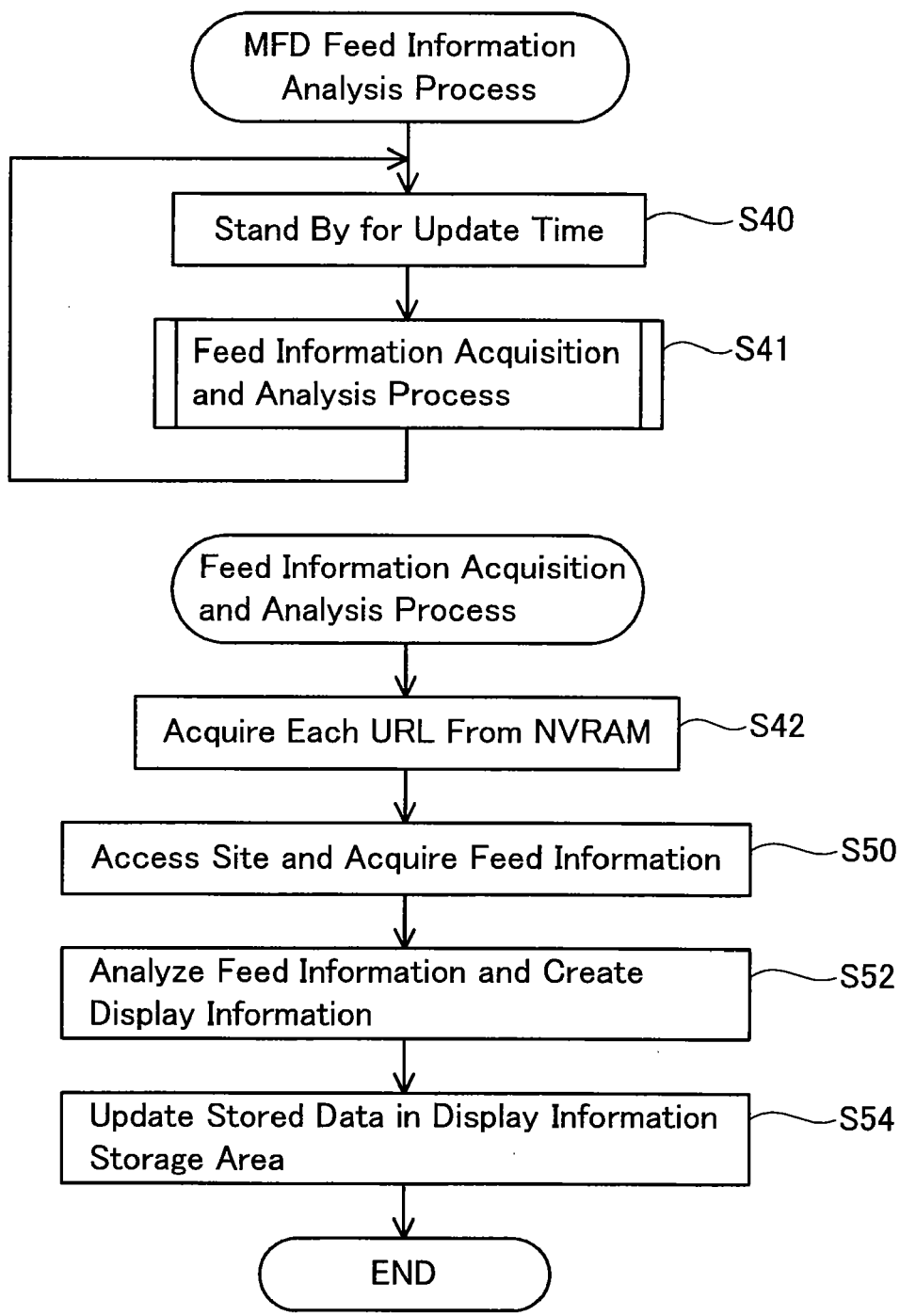
FIG. 5 shows a flowchart of a feed information analysis process executed by the multi-function device.

As shown in the upper portion of FIG. 5, the CPU 14 stands by until an update time has arrived (S40). The update time may, for example, be set by the user, or may be determined by a program. When the update time is reached, the process proceeds to S41. In S41, the CPU 14 executes a feed information acquisition process. The details of the feed information acquisition process will be described in detail next.

(Feed Information Acquisition Process Executed by the Multi-Function Device)

As shown in the lower portion of FIG. 5, in S42, the CPU 14 acquires each URL 100 from the URL storage area 44 of NVRAM 40 (see FIG. 3). Next, in accordance with the internet connection program 20, the CPU 14 accesses the respective URL acquired in S42, and acquire feed information therefrom (S50). That is, in a case where two URLs had been acquired in step S42, the CPU 14 retrieves two pieces of feed information in step S50. Each of the feed information includes the site information 120 and one or more pieces of updated content information 132 shown in FIG. 4. The CPU 14 generates the display information 112 shown in FIG. 4 by analyzing each of the feed information (S52). The CPU 14 stores the display information 112 generated in S52 for each of the feed information in the display information storage area 36 (S54). For example, in the event that new display information 112 was created for the site corresponding to the URL "http://www.example0.com" that is associated with user X, the CPU 14 clears the old display information 112 corresponding to the URL "http://www.example0.com", and stores the new display information 112. When the CPU 14 acquires feed information from all URLs 100 stored in the URL storage area 44 and creates display information 112 based on the aforesaid feed information, the feed information acquisition process will be complete, and the CPU 14 returns to S40. By executing the feed information analyzing process of FIG. 5, the latest feed information for each site is stored in the display information storage area 36.

(Display Process Executed by the Multi-Function Device)

Next, a display process for the CPU 14 of the multi-function device 10 to display the feed information will be explained. The display process runs as an independent task, and is executed when the multi-function device 10 is activated in accordance with the feed information display program 24 (see FIG. 2).

Figure 10:
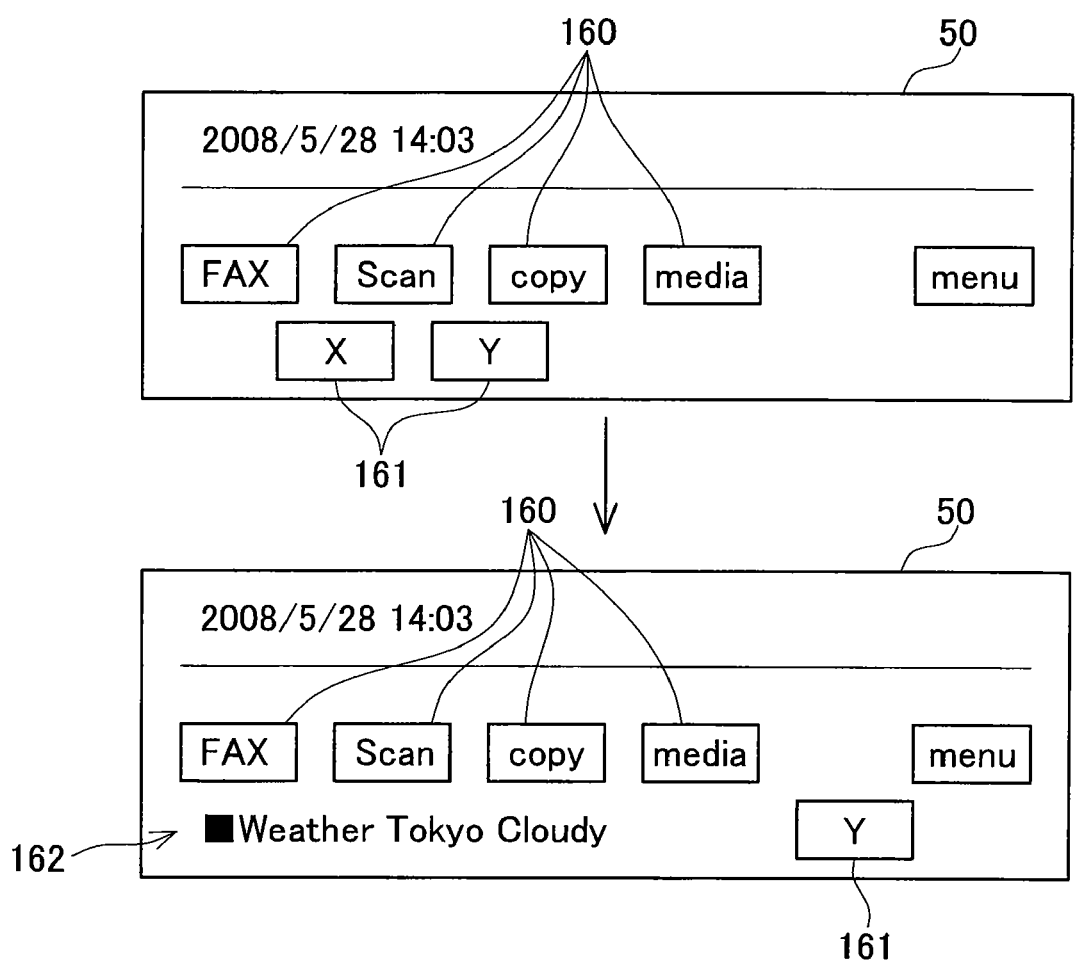
FIG. 10 shows an example of what is displayed on a display panel.

The multi-function device 10 has a plurality of states, such as a power saving state, a waiting state, a function execution state. In the power saving state, nothing is displayed on the display panel 50 (the display panel 50 is turned off). When an operation for cancelling the power saving state is performed on the key pad 52 during the power saving state, the state shifts to the waiting state. In the waiting state, information for selecting a function is displayed on the display panel 50 (the display panel 50 is turned on). As shown in the upper portion of FIG. 10, the user can input a function execution command into the multi-function device 10 by operating a button 160 for selecting the function. In this case, the state shifts to the function execution state. In the function execution state, information relating to the function being executed is displayed on the display panel 50 (e.g. the number of copies, etc.). Note that the function execution command can also be input into the multi-function device 10 during the power saving state. For example, a print command from the PCs 70, 71 can be input into the multi-function device 10 in the power saving state. In this case as well, the state shifts to the function execution state.

When the function being executed in the multi-function device 10 is completed, the multi-function device 10 shifts to the waiting state (alternately, the state may shift to the power saving state). In addition, when the power saving state shift timer exceeds a time limit during the waiting state, the multi-function device 10 shifts to the power saving state. This feature will be described in detail later.

Figure 6:
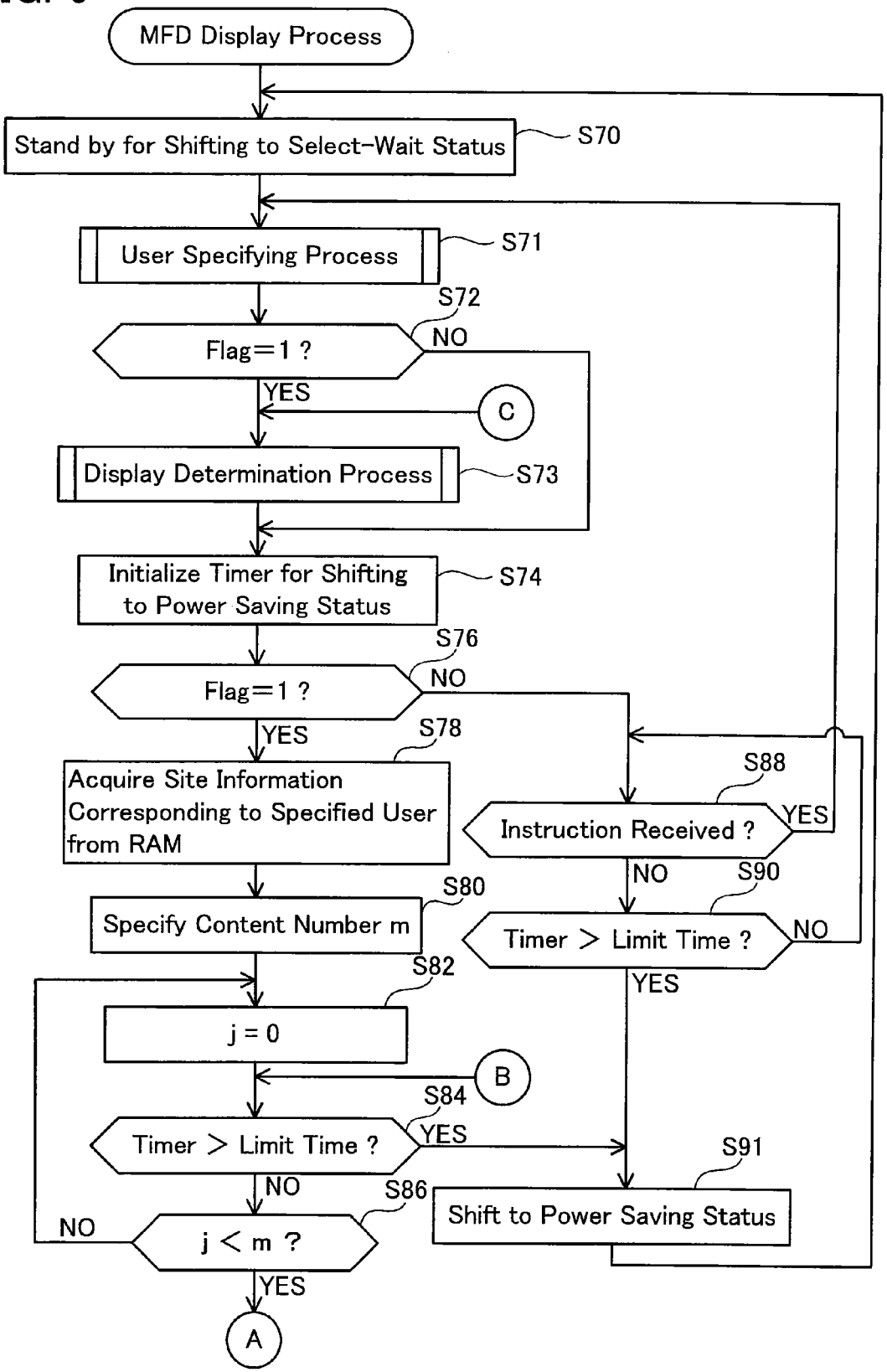
FIG. 6 shows a flowchart of a display process executed by the multi-function device.

As shown in FIG. 6, in S70, the CPU 14 stands by until the multi-function device 10 has shifted from the power saving state or the function execution state to the waiting state (S70). When the multi-function device 10 shifts to the waiting state (i.e., when a function execution command is input), the process proceeds to S71. In other words, for example, when a print command is input from the PCs 70, 71, or when a command for cancelling the power saving state and displaying the button 160 is input (i.e., a command applied by the keyboard 52), the CPU 14 proceeds to S71. In S71, the CPU 14 executes a user specifying process. The details of the user specifying process will be described in detail next.

(User Specifying Process)

Figure 8:
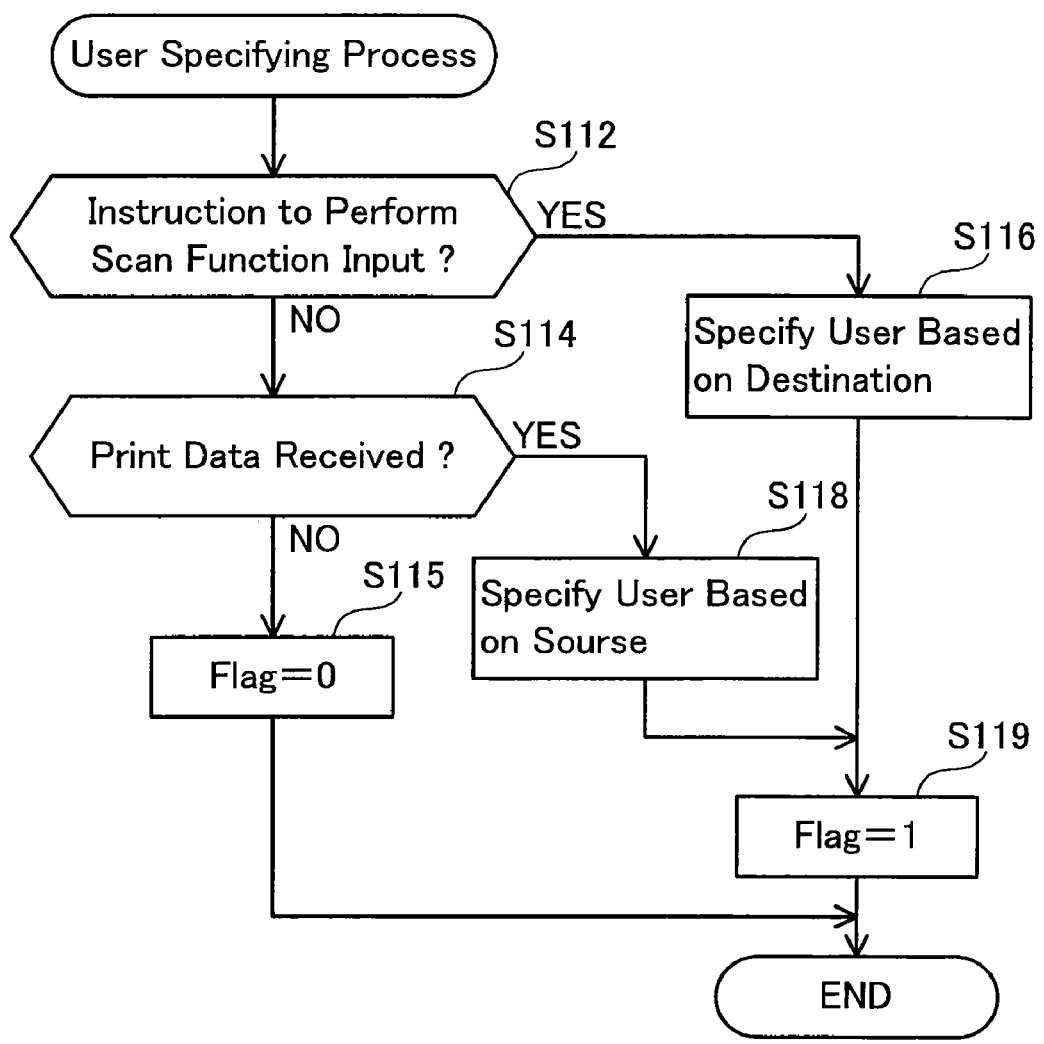
FIG. 8 shows a flowchart of a user specifying process executed by the multi-function device.

As shown in FIG. 8, the CPU 14 determines whether an execution command for the scan function has been input (S112). The user can operate the Scan button 160 shown in FIG. 10. Furthermore, the user can designate the PC identification information (e.g., IP address and host name) as the destination of the scan data by operating the keyboard 52 (YES to S112). In the event where S112 is YES, the CPU 14 specifies the user name associated with the destination PC identification information of the scan data from the default PC information storage area 46 (see FIG. 2) (S116). When S116 is complete, the CPU 14 stores a flag "1" (S119). The process then proceeds to S72 of FIG. 6 when S119 is complete.

In the event where NO is determined in S112, the CPU 14 determines whether a print command that includes print data has been received (S114). In the event where this step is YES, the flow proceeds to S118. As noted above, the print command includes the PC identification information of the sender of that print command. The CPU 14 specifies the PC identification information included in the print command. Next, the CPU 14 specifies the user name associated with the specified PC identification information from the default PC information storage area 46 (see FIG. 2) (S118). When S118 is complete, the CPU 14 stores a flag "1" (S119). The process proceeds to S72 of FIG. 6 when S119 is complete.

Note that a command that cannot specify the user (that is, a command other than the execution command for the scan function or the print command) may be input into the multi-function device 10. In this case, the CPU 14 determines NO in S114, and stores a "0" as the flag (S115). The process proceeds to S72 of FIG. 6 when S115 is complete.

In S72 of FIG. 6, the CPU 14 determines whether flag of "1" has been stored in the user specifying process (S72). In the event the flag is "1", the CPU 14 proceeds to S73 (to execute a display determination process). The details of the display determination process will be described in detail next. Note that in the event where S72 is NO in FIG. 6 (i.e., in the event that the flag "0" has been stored in the user specifying process), the CPU 14 proceeds to S74 without executing the display determination process.

(Display Determination Process)

Figure 9:
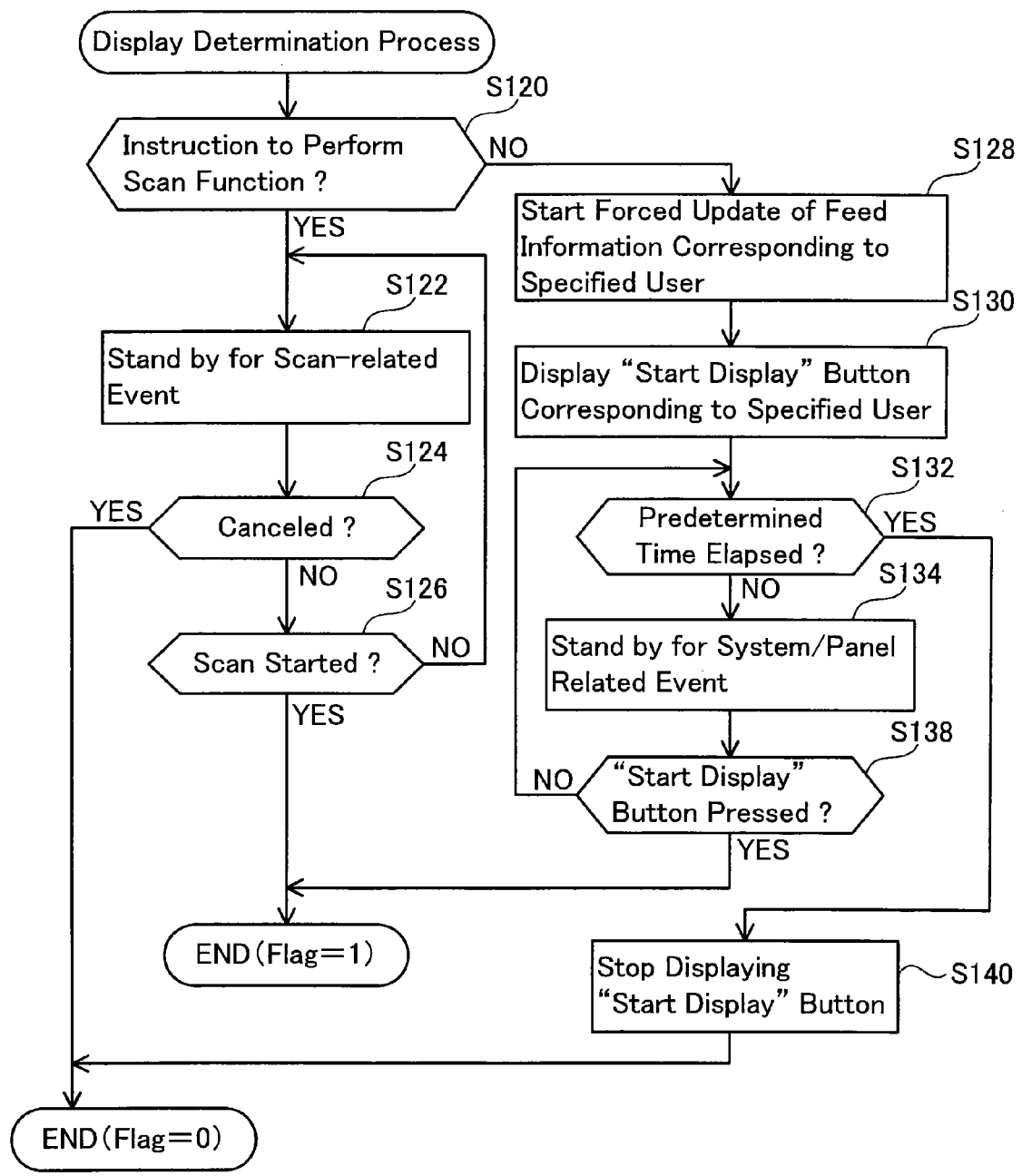
FIG. 9 shows a flowchart of a display determination process executed by the multi-function device.

Next, the display determination process executed in S73 of FIG. 6 will be explained. As shown in FIG. 9, the CPU 14 determines whether the execution command for the scan function has been input (S120). In other words, this step is the same as the determination process of S112 of FIG. 8. In the event where S120 is YES, the CPU 14 waits until a scan related event occurs (S122). Next, the CPU 14 determines whether the event that has occurred in S122 is the operation of a button for cancelling the execution of the scan function (S124). In the event where S124 is YES, the CPU 14 stores the flag "0", completes the display determination process, and proceeds to S74 of FIG. 6.

In the event where S124 is NO, the CPU 14 determines whether the event that has occurred in S122 is the operation of a button for starting the execution of the scan function (S126). In the event where S126 is YES, the CPU 14 stores the flag "1", completes the display determination process, and proceeds to S74 of FIG. 6. At the same time, a scan process is started at the scan portion 56. In contrast, in the event where NO is determined in S126, the CPU 14 executes a process in accordance with the event activated at S122 as a separate task (not illustrated), and returns to S122.

In contrast, in the event where YES is determined in S114 of FIG. 8 (i.e., in the event that a print command was received), NO is determined in S120. In this case, the CPU 14 starts a process that updates the display information 112 associated with the user name specified in the user specifying process (S128). In other words, the CPU 14 starts the feed information acquisition process shown in FIG. 5 based upon the user name specified in the user specifying process. More specifically, in S42 of FIG. 5, the CPU 14 specifies the URL 100 associated with the user name specified in the user specifying process from the URL storage area 44 (see FIG. 3). Here, a URL 100 associated with a user name other than the user name specified in the user specifying process is not specified. Next, the CPU 14 executes the processes of S50 to S54 of FIG. 5 based upon the URL 100 specified in S42.

Next, the CPU 14 displays, on the display panel 50, a display start button that corresponds to the user name specified in the user specifying process (S130). Examples of the display start button displayed in S130 are shown on the upper portion of FIG. 10. In this drawing, a display start button 161 that corresponds to the user name "X" and another display start button 161 that corresponds to the user name "Y" are shown. This indicates that a print command has been received respectively from the PC corresponding to user name "X" (e.g., PC 70) as well as from the PC corresponding to user name "Y" (e.g., PC 71). Note that when, for example, a print command is received first from the PC corresponding to user name "X", and another print command is later received from the PC corresponding to user name "Y", the display start button 161 corresponding to user name "X" is displayed first, and the display start button 161 corresponding to user name "Y" is displayed later. In this case, with respect to the display start button 161 that corresponds to user name "X", and the display start button 161 that corresponds to user name "Y", the CPU 14 measures the time elapsed from when the display of that display start button 161 has started. Alternately, from the start to the completion of a print process based upon the print command from the PC corresponding to the user name "X", the CPU 14 may display the display start button 161 corresponding to the user name "X", and if the print process relating to that user name "X" is complete, the CPU 14 may start to display the display start button 161 corresponding to the user name "Y".

Next, the CPU 14 determines whether a predetermined period of time has elapsed from when the display of the display start button 161 was started in S130 (S132). For example, in the event that the display start button 161 has not been operated by the user corresponding to the user name "X" from when the display start button 161 corresponding to the user name "X" is displayed until the aforementioned predetermined time period has elapsed, YES is determined in S132. In this case, the CPU 14 terminates the display of the display start button 161 corresponding to user name "X" (S140). Next, the CPU 14 stores the flag "0", completes the display determination process, and proceeds to S74 of FIG. 6.

In contrast, in the event where NO is determined in S132, the CPU 14 monitors the occurrence of system/panel related events. When the display start button 161 is operated by the user, the CPU 14 determines YES in S138. In this case, the CPU 14 stores the flag "1", completes the display determination process, and proceeds to S74 of FIG. 6.

The CPU 14 initializes the power saving state shift timer when the display determination process is complete (S74). The power saving state shift timer is a timer for counting how much of the time has elapsed, which is a time during which a shift to the power saving state is allowed when no event is generated during the waiting state. Next, the CPU 14 determines whether the flag "1" has been stored in the display determination process (S76). In the event the flag is "1", the CPU 14 proceeds to S78.

In S78, the CPU 14 specifies the user name (e.g., "X") corresponding to the display start button 161 operated in S138 of FIG. 9. Next, the CPU 14 specifies, from the display information storage area 36 of the RAM 30, the site information 120 included in the display information 112 associated with the specified user name. Note that when the update of the display information 112 by the feed information analyzing process started in S128 of FIG. 9 is complete, the site information 120 is acquired from the newest display information 112 after update. In contrast, when the update of the display information 112 is not complete, the site information 120 is acquired from the display information 112 that has been stored in the storage area 36 from prior to update.

Next, the CPU 14 specifies the number of updated content information 132 included in the display information 112 acquired in S78 (S80). For example, in FIG. 4, in the case of the display information 112 associated with user name "X", there are m pieces of content. In this case, the CPU 14 specifies "m" in S80. Next, the CPU 14 initializes the counter j (S82). Next, the CPU 14 determines whether the power saving state shift timer initiated in S74 has exceeded the time limit (S84). In the event where YES is herein determined, the CPU 14 causes a state shift to the power saving state (S91). In other words, the CPU 14 turns the backlight of the display panel 50 OFF, and shifts the state to a state in which nothing is displayed on the display panel 50. Next, the CPU 14 returns to S70, and waits until the multi-function device 10 has shifted to the waiting state. In contrast, in the event where NO is determined in S84, the CPU 14 determines whether the counter j is smaller than m (S86). If YES is herein determined, the CPU 14 proceeds to S92 of FIG. 7.

Note that in the event where NO is determined in S76 of FIG. 6 (i.e., in the event that the flag "0" is stored in the display determination process), the CPU 14 proceeds to S88. In S88, the CPU 14 determines whether any execution command (scan function execution command, print command, etc.) has been input from the user during the waiting state. In the event where YES is herein determined, the CPU 14 returns to S71 and executes the user specifying process. In contrast, if NO in S88, the CPU 14 determines whether the power saving state shift timer initiated in S74 has exceeded the time limit (S90). If YES is herein determined, the CPU 14 shifts the state to the power saving state (S91). Next, the CPU 14 returns to S70, and waits until the multi-function device 10 has shifted to the waiting state.

Figure 7:
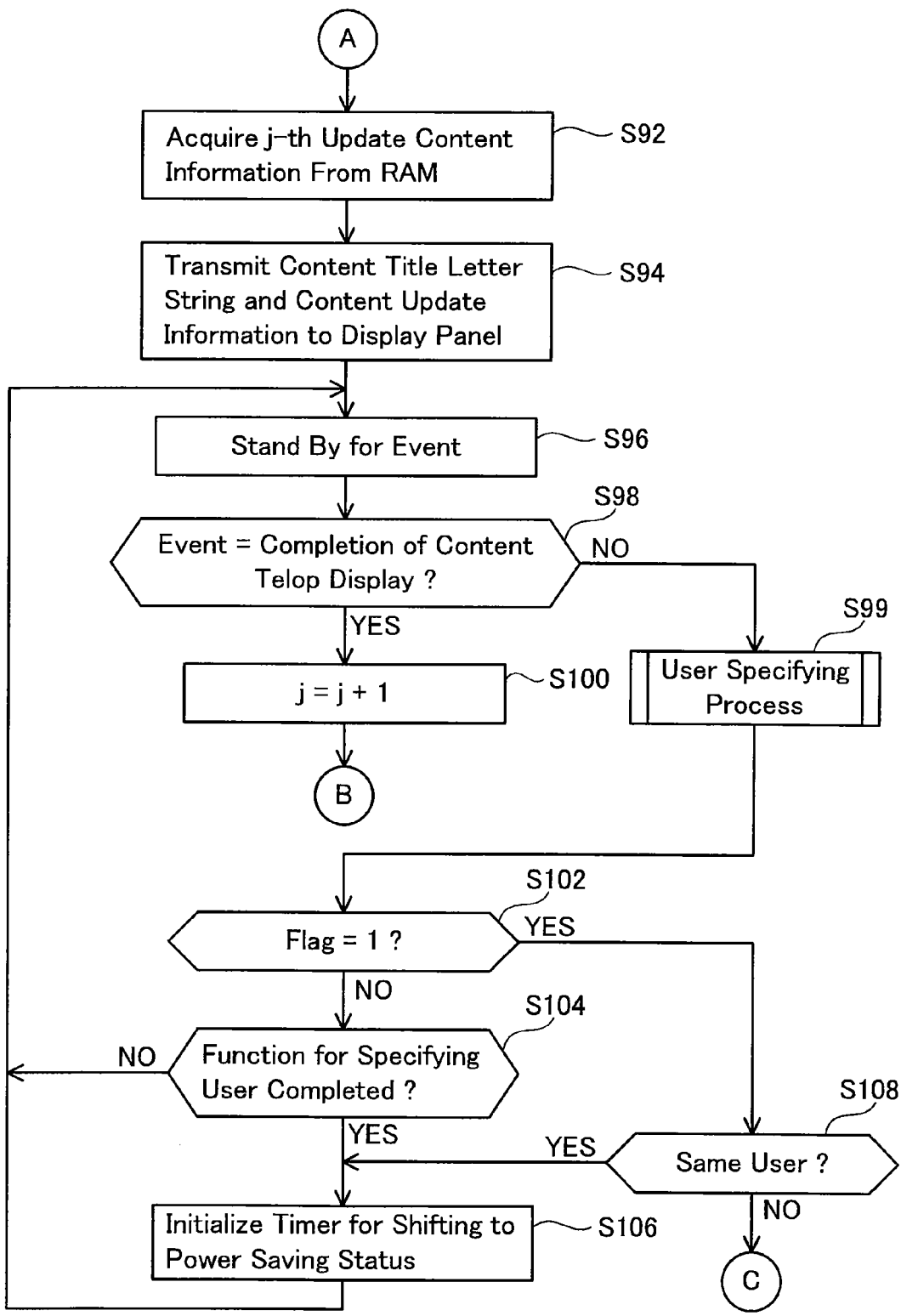
FIG. 7 shows a flowchart following FIG. 6.

In S92 of FIG. 7, the CPU 14 acquires the j-th update content information from the display information 112 specified in S78. In this way, a content title letter string 140, content update time 142, a summarized content letter string 144, and a content URL 146 for one single content (e.g., the j-th piece of content) are acquired (S92). Next, the CPU 14 sends the content title letter string 140 and the content update time 142 acquired in S92 to the display panel 50 (S94). As a result, as shown in the lower portion of FIG. 10, the content title letter string 162 is displayed on the display panel 50. Note that the content title letter string 162 is capable of scrolling (e.g., move from right to left). In other words, the content title letter string 162 may be displayed in a ticker style. Note that the site title letter string 122, the content update information 142, the summarized content letter string 144, etc. may be displayed on the display panel 50, or alternately, may not be displayed thereon. A summarized display screen (e.g., in a form of an independent pop-up display) may be provided, and the display may be switchably displayed. In addition, the site title letter string 122 included in the site information 120, the feed update information 124, etc. may be displayed on the display panel 50, or alternately, may not be displayed thereon. The process then proceeds to S96 when S94 is completed.

In S96, the CPU 14 stands by until an event occurs. If an event occurs, the process proceeds to S98. In S98, the CPU 14 determines whether the ticker display of the content title letter string 162 is complete. In the event where YES is herein determined, the CPU 14 adds 1 to the counter j (S100), and proceeds to S84 of FIG. 6. In S84, the CPU 14 determines whether the power saving state shift timer has exceeded the time limit. In the event where NO is herein determined, the CPU 14 determines whether the counter j is smaller than m (S86). If YES is determined here, the CPU 14 executes S92 and S94 again. In this way, the content title letter string 162 is displayed as a ticker based upon the next update content information (e.g., the 1st update content information).

In contrast, in the event of NO in S98, the CPU 14 proceeds to S99. In S99, the CPU 14 executes the user specifying process shown in FIG. 8. The CPU 14 proceeds to S102 when the user specifying process is complete. In S102, the CPU 14 determines whether the flag "1" has been stored in the user specifying process executed in S99 (S102). In the event the flag is "1", the CPU 14 proceeds to S108. In S108, the CPU 14 determines whether the user name specified in the user specifying process executed in S99 is the same as the user name associated with the display information 112 of which the content title letter string 162 is currently displayed (the user name corresponding to the display start button 161 operated in S138 of FIG. 9) (S108). In the case of YES in S108, the CPU 14 initializes the power saving state shift timer (S106), and returns to S96 and waits until another event is activated. In other words, if it is the same user name, the display information 112 (specifically, the content title letter string 162 thereof) associated with that user name is continuously displayed. In contrast, in the case of NO in S108, the CPU 14 executes the display determination process and returns to S73. In this display determination process, the processes in the flowchart are executed based upon the command input in S102 and the user specified in S108.

In the event where NO is determined in S102 of FIG. 7, the CPU 14 proceeds to S104. In S104, the CPU 14 determines whether a function that can specify a user (i.e., print or scan function in the present embodiment) has completed its operation. In the event where YES is herein determined, the CPU 14 initializes the power saving state shift timer (S106), and returns to S96 and waits until another event is activated. In contrast, in the event where NO is determined in S104, the CPU 14 executes a process in accordance with the event, returns to S96, and waits until the next event is activated.

The multi-function device system 2 of the present embodiment has been described in detail. The multi-function device 10 can display the content title letter strings 162 of content. This display is terminated when the power saving state shift timer exceeds the time limit. Because the titles of the content will not always be displayed, the multi-function device 10 is superior from the standpoint of energy conservation when compared to a method of always displaying the content title letter strings 162. In addition, the presence of the user near the multi-function device 10 is assured in situations in which the scan function execution command is input into the multi-function device 10 due to the user operating the button 160. In contrast, the user may not be near the multi-function device 10 in situations in which the print command from the PC 70 etc. is input into the multi-function device 10. The multi-function device 10 will start to display the content title letter strings 162 in the former situation. In contrast, in the latter situation, the multi-function device 10 will not display the content title letter strings 162 until the user further operates the display start button 161 on the multi-function device 10. The display of the content title letter strings 162 can be started only in situations in which the user is definitely near the multi-function device 10. Because the display will not be started in situations in which the user is not near the multi-function device 10, the multi-function device 10 is advantageous in the standpoint of energy conservation.

In addition, when the multi-function device 10 of the present embodiment is employed, the user can, for example, register information associated with the PC identification information 64 of the PC that he or she is using, and his or her user name 66, in the multi-function device 10 (see the default PC information storage area 46 of FIG. 2). Furthermore, the user can register information associated with a URL 100 of feed information that the user desires to view, and his or her user name 102, in the multi-function device 10 (see URL storage area 44 of FIG. 3). The user (e.g., user name "X") can send a print command from the PC that he or she uses to the multi-function device 10. In this case, when the display start button 161 corresponding to the user name "X" is displayed, and that display start button 161 is operated, the content title letter string 162 included in the display information 112 associated with the user name "X" is displayed. According to the present embodiment, based upon the instruction from the user, the one or more content title letter strings 162 included in the feed information of a site registered by that user can be displayed. Note that when the display start button 161 is not operated within a predetermined time period, the display of the display start button 161 is cancelled (see S140 of FIG. 9). Because of this, the power consumption of the multi-function device 10 can be saved.

As noted above, in the present embodiment, the display start button 161 corresponding to a user who has issued an instruction to the multi-function device 10 is displayed. For example, prior to a print command from a PC corresponding to user name "X" being received by the multi-function device 10, and the display start button 161 corresponding to the user name "X" being operated, it is possible for a print command from a PC corresponding to user name "Y" to be received by the multi-function device 10. In this case, as shown in the upper portion of FIG. 10, the multi-function device 10 displays the display start button 161 corresponding to user name "X" and the display start button 161 corresponding to user name "Y" respectively. The multi-function device 10 displays the content title letter strings 162 included in the display information 112 associated with the user name "X" when the display start button 161 corresponding to the user name "X" is operated. In addition, the multi-function device 10 displays the content title letter strings 162 included in the display information 112 associated with the user name "Y" when the display start button 161 corresponding to the user name "Y" is operated. In other words, when a user operates the display start button 161 corresponding to him or her, the content title letter string 162 included in the feed information of the site that was registered by that user is displayed. According to the present embodiment, the content title letter string 162 included in the feed information of a site registered by a user that is near the multi-function device 10 can be displayed.

In addition, while the content title letter string 162 is being displayed based upon a print command sent from, for example, PC 70, the multi-function device 10 can display the content title letter string 162 included in the feed information that was registered by the user of PC 71 when, for example, a scan function execution command was input in which the destination of the scan data is the PC 71 (when the answer in S108 of FIG. 7 is NO). In contrast, while the content title letter string 162 is being displayed based upon the print command sent from, for example, PC 70, the multi-function device 10 can continuously display the content title letter string 162 when the scan function execution command was input in which the destination of the scan data is the same PC 70 (when the answer in S108 of FIG. 7 is YES). This technology is used when a print command was input while a content title letter string 162 is being displayed based upon another print command; when a print command was input while a content title letter string 162 is being displayed based upon a scan function execution command; and when a scan function execution command was input while the content title letter string 162 is being displayed based upon another scan function execution command.

In addition, if a user has not operated the display start button 161 displayed on the display panel 50 from when the display start button 161 is displayed until a predetermined time period has expired, the multi-function device 10 terminates the display of that display start button 161. Because of this, energy consumption can be reduced.

In addition, the multi-function device 10 can display the latest content information in the event that the acquisition of updated content information is complete when the display start button 161 has been operated.

(1) In the aforementioned embodiment, the plurality of content servers 90, 91 store both the content and feed information. However, a configuration is also possible in which one server stores the content and another server stores the feed information.

(2) The aforementioned multi-function device 10 does not have a browser program. However, the multi-function device 10 may have the browser program. The multi-function device 10 may download the content for display on the display panel 50.

(3) In the event that an execution command for a copy function or a FAX function has been input, the multi-function device 10 may display the display information 112 associated with the user that has input that execution command.

(4) In the aforementioned embodiment, the PC identification information, which is an example of device specification information, may be a MAC address, a node name, a user name, etc.

(5) In the aforementioned embodiment, the CPU 14 displays, on the display panel 50, a display start button that corresponds to a user name specified in the user specifying process. Alternately, the CPU 14 may display, on the display panel 50, information on the PC corresponding to that user name or other information as the display start button.

(6) In the aforementioned embodiment, the CPU 14 specifies, in S78, the user name corresponding to the display start button 161 operated in S138 of FIG. 9. Alternately, if the user name is specified in S118 of FIG. 8, and the scan function execution command was input in S120 of FIG. 9, the CPU 14 may specify the site information 120 included in the display information 112 associated with the user name specified in S118 from the display information storage area 36 of RAM 30.

(7) In the aforementioned embodiment, the CPU 14 determines YES in S138 when the user touches the display start button 161 displayed on display panel 50. Alternately, a physical key may be pressed as the display start button. In this case, the CPU 14 may determine YES in S138 by the display start button key being pressed.

What is claimed is:

1. A processing apparatus configured to perform a process in accordance with a processing instruction, and be connected to a network in a communicable manner, the processing apparatus comprising:
    an address information storage unit configured to store address information of summarized content information that includes at least titles of content;
    a display unit configured to display information;
    an instruction input unit configured to allow a user to input an instruction;
    an image forming unit;
    one or more processors; and
    a memory that stores a computer program including instructions that, when executed by the one or more processors, cause the one or more processors to function as:
        a summarized information acquisition unit configured to acquire the summarized content information based on the address information stored in the address information storage unit;
        an instruction receiving unit configured to receive a first processing instruction from the network;
        a display control unit configured to:
            display the titles of the content included in the summarized content information acquired by the summarized information acquisition unit on the display unit when a second processing instruction is input to the instruction input unit,
            not display the titles of the content included in the summarized content information acquired by the summarized information acquisition unit on the display unit when the first processing instruction is received by the instruction receiving unit, and
            display the titles of the content included in the summarized content information acquired by the summarized information acquisition unit on the display unit on a condition that a predetermined instruction that is different from the second processing instruction is input to the instruction input unit after the first processing instruction is received by the instruction receiving unit; and
        a title display termination unit configured to terminate the display of the titles of the content in a case where a predetermined condition is met,
    wherein the image forming unit is configured to create, in a case where the second processing instruction is input to the instruction input unit, image data representing an image in accordance with the second processing instruction.

2. The processing apparatus according to claim 1, wherein the address information storage unit is configured to store a plurality of association information, each of which is an association of device specification information specifying a device in the network and address information of summarized content information,
    the summarized information acquisition unit is configured to acquire the summarized content information based on each address information stored in the address information storage unit,
    the instruction receiving unit is configured to receive the first processing instruction including device specification information of a source, and
    the display control unit is configured to display, on the display unit, on the condition that the predetermined instruction is input to the instruction input unit after the first processing instruction is received by the instruction receiving unit, the titles of the content included in the summarized content information acquired by the summarized information acquisition unit based on the address information associated with the device specification information included in the first processing instruction.

3. The processing apparatus according to claim 2, wherein the display control unit is configured to further display related information related to the device specification information included in the first processing instruction on the display unit in the case where the first processing instruction is received by the instruction receiving unit,
    the instruction input unit is configured to allow the user to input the predetermined instruction including an instruction to designate the related information displayed on the display unit, and
    the display control unit is configured to display, on the display unit, on the condition that the predetermined instruction is input to the instruction input unit after the first processing instruction is received by the instruction receiving unit, the titles of the content included in the summarized content information acquired by the summarized information acquisition unit based on the address information associated with the device specification information that relates to the related information that has been designated when the predetermined information is input.

4. The processing apparatus according to claim 3, wherein the instructions, when executed by the one or more processors, cause the one or more processors to further function as a related information display termination unit configured to terminate the display of the related information in a case where the predetermined information including the instruction to designate the related information is not input to the instruction input unit within a predetermined time since the display of the related information on the display unit has begun.

5. The processing apparatus according to claim 2, wherein the instructions, when executed by the one or more processors, cause the one or more processors to further function as:
    a first determination unit configured to determine, in a case where a subsequent first processing instruction is received by the instruction receiving unit while the titles of the content are displayed on the display unit in accordance with a previous first processing instruction, whether the device specification information included in the previous first processing instruction is identical to the device specification information included in the subsequent first processing instruction,
    wherein the display control unit is configured to:
        display the titles of the content included in the summarized content information on the display unit in a predetermined order, display, in a case where a negative determination is made by the first determination unit and the predetermined instruction is input to the instruction input unit, the titles of the content included in the summarized content information acquired by the summarized information acquisition unit based on the address information associated with the device specification information included in the subsequent first processing instruction in the predetermined order from a head title on the display unit, and keep displaying, in a case where an affirmative determination is made by the first determination unit, the titles of the content that are displayed in accordance with the previous first processing instruction on the display unit.

6. The processing apparatus according to claim 1, wherein:

the image forming unit is a scan and the image data is scan data, the address information storage unit is configured to store a plurality of association information, each of which is an association of device specification information specifying a device in the network and address information of summarized content information, the summarized information acquisition unit is configured to acquire the summarized content information based on each address information stored in the address information storage unit, the instruction input unit is configured to allow the user to input the second processing instruction including an instruction to designate device specification information of a destination of the image data, and the image forming unit is configured to create, in a case where the second processing instruction is input to the instruction unit, the image data by scanning in accordance with the second processing instruction, and send the image data with the device specification information as a destination that has been designated when the second processing instruction is input, and the display control unit is configured to display, when the second processing instruction is input to the instruction unit, the titles of the content acquired by the summarized information acquisition unit based on the address information associated with the device specification information that has been designated when the second processing instruction is input.

7. The processing apparatus according to claim 6, wherein the instructions, when executed by the one or more processors, cause the one or more processors to further function as a second determination unit, wherein the instruction receiving unit is configured to receive the first processing instruction including device specification information of a source, the display control unit is configured to display, on the display unit, on the condition that the predetermined instruction is input to the instruction input unit after the first processing instruction is received by the instruction receiving unit, the titles of the content included in the summarized content information acquired by the summarized information acquisition unit based on the address information associated with the device specification information included in the first processing instruction, the second determination unit is configured to determine, in a case where a specific second processing instruction is input to the instruction input unit while the titles of the content are displayed in the display unit in accordance with a specific first processing instruction, whether the device specification information included in the specific first processing instruction is identical to the device specification information that has been designated when the specific second processing instruction is input, and the display control unit is configured to:

display the titles of the content included in the summarized content information on the display unit in a predetermined order, display, in a case where a negative determination is made by the second determination unit, the titles of the content included in the summarized content information acquired by the summarized information acquisition information based on the address information associated with the device specification information that has been designated when the specific second processing instruction is input to the predetermined order from a head title on the display unit, and keep displaying, in a case where an affirmative determination is made by the second determination unit, the titles of the content that are displayed in accordance with the specific first processing instruction on the display unit.

8. The processing apparatus according to claim 6, wherein the instructions, when executed by the one or more processors, cause the one or more processors to further function as a second determination unit, wherein the instruction receiving unit is configured to receive the first processing instruction including device specification information of a source, the display control unit is configured to display, on the condition that the predetermined instruction is input to the instruction input unit after the first processing instruction is received unit, the titles of the content included in the summarized content information acquired by the summarized information acquisition unit based on the address information associated with the device specification information included in the first processing instruction, the second determination unit is configured to determine, in a case where a specific first processing instruction is received by the instruction receiving unit while the titles of the content are displayed on the display unit in accordance with a specific second processing instruction, whether the device specification information included in the specific first processing instruction is identical to the device specification information that has been designated when the specific second processing instruction is input, and the display control unit is configured to:

display the titles of the content included in the summarized content information on the display unit in a predetermined order, display, in a case where a negative determination is made by the second determination unit and the predetermined instruction is input to the instruction input unit, the titles of the content included in the summarized content information acquired by the summarized information acquisition unit based on the address information associated with the device specification information included in the specific first processing instruction in the predetermined order from a head title on the display unit, and keep displaying, in a case where an affirmative determination is made by the second determination unit, the titles of the content that are displayed in accordance with the specific second processing instruction on the display unit.

9. The processing apparatus according to claim 1, wherein
the summarized information acquisition unit is configured to start acquiring, in the case where the first processing instruction is received by the instruction receiving unit, new summarized content information based on the address information stored in the address information acquisition unit, and the display control unit is configured to:

display, in a case where acquisition of the new summarized content information has been completed by the time when the predetermined instruction is input to the instruction input unit, the titles of the content included in the new summarized content information on the display unit, and display, in a case where the acquisition of the new summarized content information has not been completed by the time when the predetermined instruction is input to the instruction input unit, the titles of the content included in old summarized content information that had been previously acquired on the display unit.

\* \* \* \* \*

UNITED STATES PATENT AND TRADEMARK OFFICE
CERTIFICATE OF CORRECTION

PATENT NO. : 8,386,936 B2  Page 1 of 1
APPLICATION NO. : 12/563664
DATED : February 26, 2013
INVENTOR(S) : Hiroyuki Sasaki It is certified that error appears in the above-identified patent and that said Letters Patent is hereby corrected as shown below:

On the Title Page, Item (57) Abstract, Line 15:
  Please replace "of content" with --of the content--

Signed and Sealed this
Eleventh Day of March, 2014

Michelle K. Lee
*Deputy Director of the United States Patent and Trademark Office*